United States Patent
Wu et al.

(10) Patent No.: US 6,300,270 B1
(45) Date of Patent: Oct. 9, 2001

(54) METHOD OF MAKING A ZEOLITE MATERIAL

(75) Inventors: An-hsiang Wu, Bartlesville; Charles A. Drake, Nowata, both of OK (US)

(73) Assignee: Richmond, Hitchcock, Fish & Dollar, Bartlesville, OK (US)

(*) Notice: Subject to any disclaimer, the term of this patent is extended or adjusted under 35 U.S.C. 154(b) by 0 days.

(21) Appl. No.: 09/261,887

(22) Filed: Mar. 3, 1999

(51) Int. Cl.$^7$ .................................................. B01J 29/06
(52) U.S. Cl. .............................. 502/66; 502/64; 502/74; 502/85; 502/86
(58) Field of Search .................................. 502/63, 64, 66, 502/74, 85, 86

(56) References Cited

U.S. PATENT DOCUMENTS

| | | | |
|---|---|---|---|
| 4,055,481 | * 10/1977 | Kidwell, Jr. | 208/89 |
| 4,500,417 | 2/1985 | Chen et al. | 208/111 |
| 5,013,422 | 5/1991 | Absil et al. | 208/27 |
| 5,169,819 | * 12/1992 | Berrebi | 502/168 |
| 5,689,026 | 11/1997 | Wu et al. | 585/475 |
| 5,856,608 | 1/1999 | Wu et al. | 585/466 |
| 5,866,744 | 2/1999 | Wu et al. | 585/486 |
| 5,905,051 | * 5/1999 | Wu et al. | 502/60 |

FOREIGN PATENT DOCUMENTS 0 449 144 * 10/1991 (EP) .

OTHER PUBLICATIONS

U.S. application Ser. No. 08/834,135, filed Apr. 14. 1997.
U.S. application Ser. No. 08/907,194, filed Aug. 6, 1997.
U.S. application Ser. No. 09/126,343, filed Jul. 30, 1998.

* cited by examiner

*Primary Examiner*—Steven P. Griffin
*Assistant Examiner*—Christina Ildebrando
(74) *Attorney, Agent, or Firm*—Jeffrey R. Anderson; Charles W. Stewart

(57) ABSTRACT

A catalyst composition prepared by a method which comprises incorporating at least one transition metal into a calcined zeolite-silica material, calcining the resulting transition metal-incorporated calcined zeolite-silica material and contacting the resulting calcined transition metal-incorporated calcined zeolite-silica material with ammonium sulfide is disclosed. The thus-obtained catalyst composition is employed as a catalyst in the conversion of a hydrocarbon feedstock to at least one aromatic.

10 Claims, No Drawings

METHOD OF MAKING A ZEOLITE MATERIAL

BACKGROUND OF THE INVENTION

The invention relates to catalyst compositions useful in hydrocarbon upgrading processes and to methods for their production and use.

In another aspect, this invention relates to processes for converting hydrocarbons to aromatic hydrocarbons with a reduction in sulfur resulting from the conversion of such hydrocarbons in the presence of such catalyst compositions.

It is known to catalytically crack non-aromatic hydrocarbons to lower olefins and aromatic hydrocarbons in the presence of catalysts which contain a zeolite (such as ZSM-5), as is described in an article by N. Y. Chen et al. in Industrial and Engineering Chemistry Process Design and Development, Volume 25, 1986, pages 151–155. However, there are ever present incentives for the development of new, more effective and/or more practical catalyst compositions and methods of preparing them.

SUMMARY OF THE INVENTION

It is an object of this invention to provide a novel catalyst composition effective for at least partially converting a hydrocarbon mixture comprising at least one hydrocarbon having in the range of from about 10 to about 25 carbon atoms per molecule to at least one hydrocarbon having less than about 10 carbon atoms per molecule and for reducing the sulfur concentration of the hydrocarbon mixture.

It is a further object of this invention to provide a method of making a novel catalyst composition, effective for at least partially converting a hydrocarbon mixture comprising at least one hydrocarbon having in the range of from about 10 to about 25 carbon atoms per molecule to at least one hydrocarbon having less than about 10 carbon atoms per molecule and for reducing the sulfur concentration of the hydrocarbon mixture, which is economical and efficient.

It is a further object of this invention to employ this novel catalyst composition in at least partially converting a hydrocarbon mixture comprising at least one hydrocarbon having in the range of from about 10 to about 25 carbon atoms per molecule to at least one hydrocarbon having less than about 10 carbon atoms per molecule and for reducing the sulfur concentration of the hydrocarbon mixture.

The inventive catalyst composition comprises a zeolite, silica, a sulfide, and at least one transition metal including, but not limited to, chromium, molybdenum, tungsten, manganese, rhenium, iron, ruthenium, osmium, cobalt, rhodium, iridium, nickel, palladium, platinum and combinations of any two or more thereof.

The catalyst composition can be prepared by the method of:
incorporating at least one transition metal into a calcined zeolite-silica material to thereby form a transition metal-incorporated calcined zeolite-silica material;
calcining the transition metal-incorporated calcined zeolite-silica material to thereby form a calcined transition metal-incorporated calcined zeolite-silica material; and
contacting the calcined transition metal-incorporated calcined zeolite-silica material with ammonium sulfide to thereby form the catalyst composition.

The inventive catalyst composition can be used in the conversion of at least a portion of a hydrocarbon or hydrocarbon mixture to at least one aromatic by contacting, under conversion conditions, a hydrocarbon feedstock with the inventive catalyst composition.

Other objects and advantages of the invention will become apparent from the detailed description and the appended claims.

DETAILED DESCRIPTION OF THE INVENTION

The silica material used in preparing the inventive catalyst composition can be any silica which has a surface area in the range of from about 300 to about 750 $m^2$/gram. The preferred form of silica is colloidal silica.

The zeolite material used in preparing the inventive catalyst composition can be any zeolite that is effective in the conversion of non-aromatic hydrocarbons to aromatic hydrocarbons when contacted under suitable reaction conditions with non-aromatic hydrocarbons. Preferably, the zeolite has a constraint index (as defined in U.S. Pat. No. 4,500,417, the disclosure of which is incorporated herein by reference) from less than about 2.0, preferably in the range from about 0.5 to less than about 2.0. Generally, the molar ratio of $SiO_2$ to $Al_2O_3$ in the crystalline framework of the zeolite is at least about 10:1 and can range up to infinity. Preferred zeolites include, but are not limited to, beta zeolite, zeolite Y, mordenite and zeolites ZSM-3, ZSM-4, ZSM-18, ZSM-20 and mixtures or combinations of any two or more thereof. The presently most preferred zeolite is beta zeolite.

In the preparation of the inventive catalyst composition, a zeolite and silica are combined to thereby form a zeolite-silica material. Any suitable method for mixing/combining the zeolite and silica components can be used to provide a homogeneous mixture of such components. Suitable types of solids-mixing machines for mixing the components of zeolite and silica can include, but are not limited to, tumblers, stationary shells or troughs, muller mixers, which are either batch type or continuous type, impact mixers, and the like.

Following the mixing of the zeolite and silica, the resulting zeolite-silica material is extruded into pellets or tablets followed by calcining under conditions sufficient to provide a calcined zeolite-silica material. Generally, such conditions can include a temperature in the range of from about 250° C. to about 1000° C., preferably from about 350° C. to about 750° C., and most preferably from 450° C. to 650° C.; and a pressure in the range of from about 0 to about 50 atmospheres (atm), preferably from about 0.1 to about 30 atm, and most preferably from 0.5 to 10 atm; for a time period in the range of from about 1 to about 30 hours, preferably from about 2 to about 20 hours, and most preferably from 3 to 15 hours.

Following the calcination of the zeolite-silica material, at least one transition metal is incorporated into the calcined zeolite-silica material by any suitable means or method known in the art for incorporating metallic elements into a material to thereby form a transition metal-incorporated calcined zeolite-silica material.

The at least one transition metal includes, but is not limited to, chromium, molybdenum, tungsten, manganese, rhenium, iron, ruthenium, osmium, cobalt, rhodium, iridium, nickel, palladium, platinum and combinations of any two or more thereof, preferably molybdenum and/or tungsten, and most preferably molybdenum.

It is preferred to use any standard incipient wetness technique for impregnating the calcined zeolite-silica material with at least one transition metal. A preferred method uses a liquid impregnation solution containing the desirable concentration of at least one transition metal in the form of at least one transition metal compound. It is particularly desirable to use an aqueous solution formed by dissolving at least one transition metal compound in water.

Examples of suitable transition metal compounds include, but are not limited to, chromium boride, chromium diboride, chromium (III) bromide hexahydrate, chromium (II) chloride, chromium (III) chloride, chromium (III) chloride hexahydrate, chromium (II) fluoride, chromium (III) fluoride, chromium (III) fluoride hydrate, chromium (III) nitrate nonahydrate, ammonium molybdate tetrahydrate, ammonium tetrathiomolybdate (VI), ammonium heptamolybdate tetrahydrate, molybdenum (III) chloride, molybdenum (V) chloride, molybdenum (VI) fluoride, molybdenum (II) iodide, molybdenum (IV) oxide, molybdenum (VI) oxide, molybdenum (IV) sulfide, ammonium tetrathiotungstate, tungsten boride, tungsten (IV) chloride, tungsten (VI) chloride, tungsten (VI) fluoride, tungsten (VI) oxide, tungsten (IV) sulfide, tungstic acid, iron (II) bromide, iron (II) bromide hydrate, iron (III) bromide, iron (II) chloride, iron (II) chloride hydrate, iron (III) chloride hexahydrate, iron disulfide, iron (II) iodide, iron (III) nitrate nonahydrate, iron (III) oxide, iron (III) oxide monohydrate, iron (II) sulfide, ammonium hexachlororuthenate (IV), chloropentaammineruthenium (III) chloride, hexaammineruthenium (III) chloride, ruthenium (III) bromide hydrate, ruthenium (IV) oxide, ruthenium (VIII) oxide, ammonium hexabromoosmate (IV), dihydrogen hexachloroosmate (IV) hexahydrate, osmium (III) chloride hydrate, osmium (VIII) oxide, potassium hexachloroosmate (IV), potassium osmate (VI) dihydrate, sodium hexachloroosmate (IV) hydrate, cobalt (II) bromide hydrate, cobalt (II) chloride, cobalt (II) chloride hexahydrate, cobalt (II) hydroxide, cobalt (II) molybdate, cobalt (II) phosphate hydrate, cobalt (II) tungstate, ammonium hexachlororhodate (III) hydrate, chloronorbornadiene rhodium (I) dimer, rhodium (III) bromide dihydrate, rhodium (III) chloride, rhodium (III) chloride hydrate, rhodium (III) iodide, rhodium (III) nitrate, rhodium (III) oxide, rhodium (III) oxide pentahydrate, ammonium hexachloroiridate (III) hydrate, ammonium hexachloroiridate (IV), dihydrogen hexachloroiridate (IV) hydrate, iridium (III) bromide tetrahydrate, iridium (III) chloride, iridium (III) chloride hydrate, iridium (IV) oxide, potassium hexachloroiridate (IV), hexaamminenickel (II) chloride, hexaamminenickel (II) iodide, nickel boride, nickel (II) bromide, nickel (II) chloride, nickel (II) chloride hexahydrate, nickel (II) fluoride, nickel (II) fluoride tetrahydrate, nickel (II) hydroxide, nickel (II) nitrate hexahydrate, nickel (II) oxide, ammonium hexachloropalladate (IV), ammonium tetrachloropalladate (II), diamminepalladium (II) nitrite, trans-dichlorodiammine palladium (II), palladium (II) bromide, palladium (II) chloride, palladium (II) iodide, palladium (II) nitrate hydrate, potassium hexachloropalladate (IV), potassium tetrabromopalladate (II), ammonium hexachloroplatinate (IV), ammonium tetrachloroplatinate (II), bromoplatinic acid hydrate, chloroplatinic acid hexahydrate, cis-dichlorodiammine platinum (II), trans-dichlorodiammine platinum (II), dihydrogen hexahydroxyplatinate (IV), platinum (II) bromide, platinum (II) chloride, platinum (IV) chloride, manganese (II) bromide, manganese (II) bromide tetrahydrate, manganese (II) chloride, manganese (II) fluoride, manganese (III) fluoride, manganese (II) iodide, manganese (II) nitrate, manganese (II) oxide, manganese (III) oxide, manganese (II) sulfide, manganese (II) tungstate, ammonium perrhenate, perrhenic acid, potassium hexachlororhenate (IV), potassium perrhenate, rhenium (III) chloride, rhenium (IV) oxide dihydrate, rhenium (VI) oxide, sodium perrhenate and mixtures or combinations of any two or more thereof.

The transition metal-incorporated calcined zeolite-silica material is calcined under conditions sufficient to provide a calcined transition metal-incorporated calcined zeolite-silica material. Generally, such conditions include those calcination conditions set out above.

The calcined transition metal-incorporated calcined zeolite-silica material is contacted by any suitable method with ammonium sulfide to thereby form the catalyst composition.

It is preferred to use any standard incipient wetness technique for contacting the calcined transition metal-incorporated calcined zeolite-silica material with ammonium sulfide. A preferred method uses a liquid impregnation solution containing the desirable concentration of ammonium sulfide. It is particularly desirable to use an aqueous solution formed by dissolving ammonium sulfide in water. The conditions suitable for contacting the calcined transition metal-incorporated calcined zeolite-silica material include a temperature in the range of from about 75° C. to about 175° C., preferably from about 80° C. to about 160°, and most preferably from 90° C. to 150° C.; and a contact time period in the range of from about 2 hours to about 40 hours, preferably from about 5 hours to about 30 hours, and most preferably from 8 hours to 25 hours.

It is believed that sulfiding the calcined transition metal-incorporated calcined zeolite-silica material enhances the catalytic activity of the catalyst composition and enhances the sulfur treatment activity of the catalyst composition.

The at least one transition metal can be present in the catalyst composition in any amount that is catalytically effective. Generally, the amount of transition metal present in the catalyst composition is in the range of from about 0.1 to about 50 weight %, preferably in the range of from about 0.5 to about 40 weight %, and most preferably from 1 to 30 weight %, based on the total weight of the catalyst composition, measured on an elemental transition metal basis.

The concentration of sulfur in the catalyst composition is generally in the range of from about 0.1 to about 40 weight %, preferably from about 0.5 to about 30 weight %, and most preferably from 1 to 10 weight %, based on the total weight of the catalyst composition, measured on an elemental sulfur basis.

All weight percents of components of the catalyst composition can be measured using X-Ray fluorescence analysis, as described in "Spectrometry: Principles and Practices in X-Ray Spectrometric Analysis" by Eugene Burton, 2nd edition.

The inventive catalyst composition is generally employed in the conversion of at least a portion of a hydrocarbon feedstock to at least one aromatic. The hydrocarbon feedstock generally comprises at least one hydrocarbon having in the range of from about 10 to about 25 carbon atoms per molecule. The at least one hydrocarbon can comprise paraffins and/or olefins and/or naphthenes and/or aromatics and/or polyaromates. The preferred hydrocarbon feedstock is fuel oil, and more preferably, fuel oil produced from a catalytic oil cracking process which mainly contains polyaromates having in the range of from about 10 to about 25 carbon atoms per molecule.

Generally, hydrogen is mixed with the hydrocarbon feedstock to form a feed mixture which is contacted with the inventive catalyst composition contained in a conversion zone. The concentration of hydrogen in the feed mixture during this contacting step is such as to provide a hydrogen to hydrocarbon molar ratio of at least about 0.01:1, preferably from about 1:1 to about 100:1, and most preferably from 5:1 to 50:1. The hydrocarbon feedstock and hydrogen can be contacted with the inventive catalyst composition by any suitable manner. The contacting step can be operated as a batch process step or, preferably, as a continuous process step. In the latter operation, a solid catalyst bed or a moving catalyst bed or a fluidized catalyst bed can be employed. Any of these operational modes have advantages and disadvantages, and those skilled in the art can select the one most suitable for a particular feed and catalyst.

The contacting step is preferably carried out within the conversion zone, wherein is contained the inventive catalyst composition, and under reaction conditions that suitably promote conversion of at least a portion of the hydrocarbon feedstock to at least one aromatic. The reaction temperature of the conversion zone is more particularly in the range of from about 200° C. to about 600° C., preferably from about 250° C. to about 550° C., and most preferably from 300° C. to 500° C. The contacting pressure of the isomerization zone is within the range of from about 200 psig to about 1500 psig, preferably from about 250 psig to about 1300 psig, and most preferably from 300 psig to 1000 psig.

The flow rate at which the hydrocarbon feedstock is charged to the conversion zone is such as to provide a weight hourly space velocity ("WHSV") in the range of from exceeding 0 hours$^{-1}$ upwardly to about 1000 hours$^{-1}$. The term "weight hourly space velocity", as used herein, shall mean the numerical ratio of the rate at which a hydrocarbon feedstock is charged to the conversion zone in pounds per hour divided by the pounds of catalyst contained in the conversion zone to which the hydrocarbon feedstock is charged. The preferred WHSV of the hydrocarbon feedstock to the conversion zone is preferably in the range of from about 0.25 hours$^{-1}$ to about 250 hours$^{-1}$ and, most preferably, from 0.5 hours$^{-1}$ to 100 hours$^{-1}$.

The following examples are presented to further illustrate the invention and are not to be construed as unduly limiting its scope.

EXAMPLE 1

This example illustrates the preparation of catalysts which were subsequently tested as catalysts in the conversion of fuel oil to aromatics.

Calcined Zeolite-silica

A 50.0 gram quantity of a commercially available beta zeolite (in the form of powder provided by United Catalysts, Inc., Louisville, Ky., under product designation Zeocat® H-Beta) was combined with a 50.0 gram quantity of a colloidal silica solution (provided by E. I. DuPont de Nemours and Company, Wilmington, Del., under product designation Ludox® AS-40). The formed mixture was then extruded into ¹⁄₁₆" diameter pellets and dried at room temperature followed by calcining at a temperature of about 538° C. for 6 hours.

Catalyst A (Control)

A 6.0 gram quantity of the above described calcined zeolite-silica was impregnated, by incipient wetness, with a solution containing 1.0 gram of ammonium polytungstate and 3.8 grams of water. The thus obtained impregnated calcined zeolite-silica was calcined at a temperature of about 538° C. for 6 hours. The final catalyst contained 10.9 weight % tungsten, based on the total weight of catalyst A.

Catalyst B (Control)

A 6.0 gram quantity of the above described calcined zeolite-silica was impregnated, by incipient wetness, with a solution containing 0.9 gram of ammonium heptamolybdate and 3.8 grams of water. The thus obtained impregnated calcined zeolite-silica was calcined at a temperature of about 538° C. for 6 hours. The final catalyst contained 7.9 weight % molybdenum, based on the total weight of catalyst B.

Catalyst C (Invention)

A 3.6 gram quantity of catalyst B was mixed with a solution containing 0.4 gram of ammonium sulfide and 1.6 grams of water. The resulting mixture was heated to a temperature of 125° C. for 16 hours.

EXAMPLE 2

This example illustrates the use of the catalysts described in Example 1 as catalysts in the conversion to aromatics (BTX) of a hydrocarbon feedstock comprising fuel oil. For each of the following Runs 1–3 the carbon number distribution of the fuel oil was about 11.1% $C_{10}$–$C_{13}$, 48.7% $C_{14}$–$C_{17}$ and 40.2% $C_{18}$–$C_{25}$, on an elemental carbon basis. The fuel oil also had an aromatic content of about 92 weight % and a sulfur content, on an elemental sulfur basis, of about 1406 ppmw, based on the total weight of the fuel oil. Test data results were obtained for each of Runs 1–3 after being on stream at least 6 hours.

In Run 1, a 2.97 g sample of catalyst A described in Example 1 was placed into a stainless steel tube reactor (length: about 18 inches; inner diameter: about 0.5 inch). Fuel oil from a fluidized catalytic cracking unit (FCCU) of a refinery was passed through the reactor at a flow rate of about 5.0 mL/hour, at a temperature of about 400° C. and at a pressure of about 780 psig. A stream of hydrogen was also passed through the reactor at a flow rate of about 15.6 L/hour to provide a hydrogen-to-hydrocarbon molar ratio of about 27.3. The formed reaction product exited the reactor tube and was passed through several ice-cooled traps. The liquid portion remained in these traps and was weighed, whereas the volume of the gaseous portion which exited the traps was measured in a "wet test meter". Liquid and gaseous product samples (collected at hourly intervals) were analyzed by means of a gas chromatograph. Test data results obtained after 6.4 hours on stream are summarized in Table 1.

In Run 2, a 2.91 g sample of catalyst B described in Example I was placed into a stainless steel tube reactor (length: about 18 inches; inner diameter: about 0.5 inch). Fuel oil from a FCCU of a refinery was passed through the reactor at a flow rate of about 5.0 mL/hour, at a temperature of about 400° C. and at a pressure of about 812 psig. A stream of hydrogen was also passed through the reactor at a flow rate of about 15.6 L/hour to provide a hydrogen-to-hydrocarbon molar ratio of about 27.3. The formed reaction product exited the reactor tube and was passed through several ice-cooled traps. The liquid portion remained in these traps and was weighed, whereas the volume of the gaseous portion which exited the traps was measured in a "wet test meter". Liquid and gaseous product samples (collected at hourly intervals) were analyzed by means of a gas chromatograph. Test data results obtained after 6.8 hours on stream are summarized in Table 1.

In Run 3, a 3.31 g sample of catalyst C described in Example 1 was placed into a stainless steel tube reactor (length: about 18 inches; inner diameter: about 0.5 inch).

Fuel oil from a FCCU of a refinery was passed through the reactor at a flow rate of about 5.0 mL/hour, at a temperature of about 400° C. and at a pressure of about 797 psig. A stream of hydrogen was also passed through the reactor at a flow rate of about 15.6 L/hour to provide a hydrogen-to-hydrocarbon molar ratio of about 27.3. The formed reaction product exited the reactor tube and was passed through several ice-cooled traps. The liquid portion remained in these traps and was weighed, whereas the volume of the gaseous portion which exited the traps was measured in a "wet test meter". Liquid and gaseous product samples (collected at hourly intervals) were analyzed by means of a gas chromatograph. Test data results obtained after 7.4 hours on stream are summarized in Table 1.

TABLE 1

| Run | Catalyst | $\Sigma C_8$-yield[1] weight percent | $\Sigma$BTX yield[2] weight percent | Sulfur[3] ppmw |
|---|---|---|---|---|
| 1 | A (control) | 65.6 | 19.2 | 410 |
| 2 | B (control) | 83.4 | 36.9 | 134 |
| 3 | C (invention) | 88.8 | 36.4 | 42 |

[1]$\Sigma C_8$-yield represents the yield of all hydrocarbons having 8 or fewer carbon atoms per molecule.
[2]$\Sigma$BTX yield represents the combined yields of benzene, toluene and xylene.
[3]$\Sigma$Sulfur ppmw represents the ppmw of sulfur contained in the total product accumulated throughout the entire time on stream for each Run.

The test data presented in Table 1 show that the use of catalysts A, B and C in Runs 1, 2 and 3, respectively, resulted in significant yields of $C_8$-products including BTX and also resulted in significant sulfur level reductions.

Inventive Run 3 demonstrated 35% and 6.5% increases in $C_8$-yield over control Runs 1 and 2, respectively, with a 90% increase in BTX yield over control Run 1 and only a 1.4% decrease in BTX yield as compared to control Run 2.

Inventive Run 3 further demonstrated 90% and 69% increases in sulfur level reduction over control Runs 1 and 2, respectively.

Reasonable variations, modifications, and adaptations can be made within the scope of the disclosure and the appended claims without departing from the scope of this invention.

That which is claimed is:

1. A method of making a catalyst composition comprising the steps of:
   (a) incorporating at least one transition metal into a calcined zeolite-silica material to thereby form a transition metal-incorporated calcined zeolite-silica material;
   (b) calcining said transition metal-incorporated calcined zeolite-silica material to thereby form a calcined transition metal-incorporated calcined zeolite-silica material; and
   (c) contacting said calcined transition metal-incorporated calcined zeolite-silica material with a solution comprising ammonium sulfide at a temperature in the range of from 75° C. to about 175° C. for a time period in the range of from about 2 hours to about 40 hours to thereby form said catalyst composition.

2. A method in accordance with claim 1 characterized further to include:
   (d) combining a zeolite and silica, prior to step (a), to thereby form a zeolite-silica material; and
   (e) calcining said zeolite-silica material to thereby form said calcined zeolite-silica material.

3. A method in accordance with claim 2 characterized further to include:
extruding said zeolite-silica material produced by step (d) prior to performing step (e).

4. A method in accordance with claim 2 wherein said zeolite comprises beta-zeolite.

5. A method in accordance with claim 2 wherein said calcination of step (b) and said calcination of step (e) are carried out at a temperature in the range of from about 300° C. to about 1000° C. for a time period in the range of from about 0.1 hour to about 30 hours.

6. A method in accordance with claim 1 wherein said at least one transition metal is incorporated into said calcined zeolite-silica material by contacting said calcined zeolite-silica material with a solution comprising at least one metal-containing material comprising said at least one transition metal.

7. A method in accordance with claim 6 wherein said at least one metal-containing material is ammonium heptamolybdate tetrahydrate.

8. A method in accordance with claim 1 wherein said at least one transition metal comprises a metal selected from the group consisting of molybdenum, chromium, tungsten, manganese, rhenium, iron, ruthenium, osmium, cobalt, rhodium, iridium, nickel, palladium, platinum and combinations of any two or more thereof.

9. A method in accordance with claim 1 wherein said at least one transition metal is present in said catalyst composition in the range of from about 0.1 weight percent to about 50 weight percent and wherein the concentration of sulfur, on an elemental sulfur basis, of said catalyst composition is in the range of from about 0.1 weight percent to about 40 weight percent, based on the total weight of said catalyst composition.

10. A method of making a catalyst composition comprising the steps of:
   (a) combining a beta zeolite and silica to thereby form a beta zeolite-silica material;
   (b) calcining said beta zeolite-silica material by heating said beta zeolite-silica to a temperature in the range of from about 300° C. to about 1000° C. for a time period in the range of from about 0.1 hour to about 30 hours to thereby form said calcined beta zeolite-silica material;
   extruding said beta zeolite-silica material produced by step
   (a) prior to performing step (b);
   (c) incorporating molybdenum into said calcined beta zeolite-silica material by contacting said calcined beta zeolite-silica material with a solution comprising ammonium heptamolybdate tetrahydrate to thereby form a molybdenum-incorporated calcined beta zeolite-silica material;
   (d) calcining said molybdenum-incorporated calcined beta zeolite-silica material at a temperature in the range of from about 300° C. to about 1000° C. for a time period in the range of from about 0.1 hour to about 30 hours to thereby form a calcined molybdenum-incorporated calcined beta zeolite-silica material;
   (e) contacting said calcined molybdenum-incorporated calcined beta zeolite-silica material with ammonium sulfide by contacting said calcined molybdenum-incorporated calcined beta zeolite-silica material with a solution comprising ammonium sulfide at a temperature in the range of from about 75° C. to about 175° C.

for a time period in the range of from about 2 hours to about 40 hours to thereby form said catalyst composition; and (f) extruding said beta zeolite-silica material produced by step (a) prior to performing step (b); wherein molybdenum is present in said catalyst composition in the range of from about 0.1 weight percent to about 50 weight percent and wherein the concentration of sulfur, on an elemental sulfur basis, of said catalyst composition is in the range of from about 0.1 weight percent to about 40 weight percent, based on the total weight of said catalyst composition.

* * * * *